United States Patent
Gokan et al.

(10) Patent No.: US 7,044,283 B2
(45) Date of Patent: May 16, 2006

(54) DRY MULTIPLE-DISK CLUTCH

(75) Inventors: Yoshitsugu Gokan, Wako (JP); Hideaki Segami, Wako (JP); Norihiro Sugita, Shizuoka-ken (JP)

(73) Assignees: Honda Motor Co., Ltd., Tokyo (JP); Kabushiki Kaisha F.C.C., Shizuoka-ken (JP)

( * ) Notice: Subject to any disclaimer, the term of this patent is extended or adjusted under 35 U.S.C. 154(b) by 2 days.

(21) Appl. No.: 10/823,510

(22) Filed: Apr. 13, 2004

(65) Prior Publication Data

US 2004/0211641 A1   Oct. 28, 2004

(30) Foreign Application Priority Data

Apr. 16, 2003   (JP) .............................. 2003-111055

(51) Int. Cl.
*F16D 13/52*   (2006.01)
*F16D 13/60*   (2006.01)

(52) U.S. Cl. ................................. 192/70.2; 192/70.27

(58) Field of Classification Search ............... 192/52.3, 192/70.18, 70.2, 70.27, 70.28, 107 C, 70.19
See application file for complete search history.

(56) References Cited

U.S. PATENT DOCUMENTS

| | | | | |
|---|---|---|---|---|
| 2,630,199 | A | * | 3/1953 | Gamble ................. 192/107 C |
| 4,714,148 | A | * | 12/1987 | Alas et al. .............. 192/107 C |
| 4,977,991 | A | * | 12/1990 | Mahoney ................ 192/70.19 |
| 5,383,544 | A | * | 1/1995 | Patel ....................... 192/70.28 |
| 5,727,665 | A | * | 3/1998 | Gonia et al. ............. 192/70.14 |
| 5,950,786 | A | * | 9/1999 | Mahoney ................ 192/70.19 |
| 6,732,846 | B1 | * | 5/2004 | Diemer et al. .......... 192/107 R |
| 6,866,132 | B1 | * | 3/2005 | Gochenour et al. ...... 192/70.18 |
| 6,892,870 | B1 | * | 5/2005 | Peterseim et al. ....... 192/107 R |

FOREIGN PATENT DOCUMENTS

JP   58-000634   1/1983

* cited by examiner

*Primary Examiner*—Saul Rodriguez
(74) *Attorney, Agent, or Firm*—Carrier, Blackman & Associates, P.C.; Joseph P. Carrier; William D. Blackman

(57) ABSTRACT

A dry multiple-disk clutch for transmitting power from the crankshaft of a motorcycle to a transmission input shaft and cutting off power transmission includes an outer clutch member interlocked with the crankshaft so as to be driven for rotation, a plurality of driving friction disks interlocked with the outer clutch member, a plurality of driven friction disks alternated with the driving friction disks and interlocked with the transmission input shaft, and a pressure member disposed opposite to the outer clutch member with the driving and the driven friction disks arranged alternately between the outer clutch member and the pressure member, and capable of moving in opposite axial direction to compress the driving and the driven friction disks together and to disengage the driven friction disks from the driving friction disks. Additionally, strap plates are disposed between a peripheral part of the outer clutch member and a peripheral part of the driving friction disks so as to be substantially tangent to the circumferences of the driving friction disks, and connect the respective peripheral parts of the outer clutch member and the driving friction disks to transmit the rotation of the outer clutch member to the driving friction disks.

15 Claims, 15 Drawing Sheets

DRY MULTIPLE-DISK CLUTCH

BACKGROUND OF THE INVENTION

1. Field of the Invention

The present invention relates to a dry multiple-disk clutch for, for example, a motorcycle and, more particularly, to a low-noise or silent dry multiple-disk clutch.

2. Description of the Related Art

A generally known dry multiple-disk clutch includes driving friction disks provided on their outside circumferences with external teeth, driven friction disks provided on their inside circumferences with internal teeth, an outer clutch member having the shape of a bottomed cylinder and provided with slots in its side wall, an inner clutch member provided with splines, and a pressure mechanism. The driving friction disks and the driven friction disks are arranged alternately with the external teeth of the driving friction disks engaged in the slots of the outer clutch member and the internal teeth of the driven clutch disks engaged with the splines of the inner clutch member. The driving clutch disks are axially movable relative to the outer clutch member, and the driven friction disks are axially movable relative to the inner clutch member. The pressure mechanism applies pressure to the superposed driving and driven clutch disks to transmit power from the outer clutch member to the inner clutch member by the agency of friction between the driving and the driven clutch disks. When the pressure applied to the driving and the driven clutch disks by the pressure mechanism is removed, the driving and the driven clutch disks are spaced apart to stop power transmission. Such a dry multiple-disk clutch is disclosed FIG. 1 of JP 2-570 B.

While engaging or disengaging such a dry multiple-disk clutch or while the rotational speed of the outer clutch member is unstable, the outer clutch member is able to move in a rotating direction relative to the driving friction disks by a circumferential displacement corresponding to gaps between each of the external teeth of the driving friction disks and edges of parts of the sidewall of the outer clutch member defining the slots of the outer clutch member. Consequently, the edges of the parts of the side wall of the outer clutch member strike against the edges of the external teeth of the driving friction disks to generate hitting sounds.

It is an object of the present invention to provide a dry multiple-disk clutch capable of controlling the generation of hitting sounds.

SUMMARY OF THE INVENTION

To achieve the object, the present invention provides a dry multiple-disk clutch for transmitting power from a drive shaft to a transmission input shaft, including an outer clutch member interlocked with the drive shaft so as to be driven for rotation by the drive shaft; a plurality of driving friction disks interlocked with the outer clutch member; a plurality of driven friction disks alternated with the driving friction disks and interlocked with the transmission input shaft; a pressure member disposed opposite to the outer clutch member with the driving and the driven friction disks arranged alternately between the outer clutch member and the pressure member, for moving in opposite axial direction to compress the driving and the driven friction disks together and to disengage the driven friction disks from the driving friction disks; and strap plates disposed between a peripheral part of the outer clutch member and peripheral parts of the driving friction disks, and connecting the respective peripheral parts of the outer clutch member and the driving friction disks.

Since there are not any gaps with respect to a rotating direction between the outer clutch member and the driving friction disks, edges, facing a rotating direction, of the outer clutch member do not strike edges, facing the edges of the outer clutch member, of the driving friction disks and hence the dry multiple-disk clutch operates silently.

Since the dry multiple-disk clutch of the present invention does not need any member corresponding to the inevitably large outer clutch member having the shape of a bottomed cylinder and included in the conventional dry multiple-disk clutch, the dry multiple-disk clutch of the present invention can be formed in compact construction.

Preferably, each of the driving friction disks is provided with a plurality of external projections, the outer clutch member is provided with a plurality of external projections, studs are attached to the external projections of the outer clutch member, respectively, and each of the strap plates has one end attached to the external projection of a corresponding of the driving friction disks and the other end fitted on a corresponding one of the studs.

Preferably, the strap plates are substantially tangent to the circumferences of the driving friction disks.

The dry multiple-disk clutch may further include strap plates disposed between the respective peripheral parts of the outer clutch member and the pressure member, and connecting the outer clutch member and the pressure member.

Preferably, the strap plates connected to the pressure member extend substantially along the circumference of the pressure member.

DESCRIPTION OF THE PRESENT EMBODIMENTS

Figure 1:
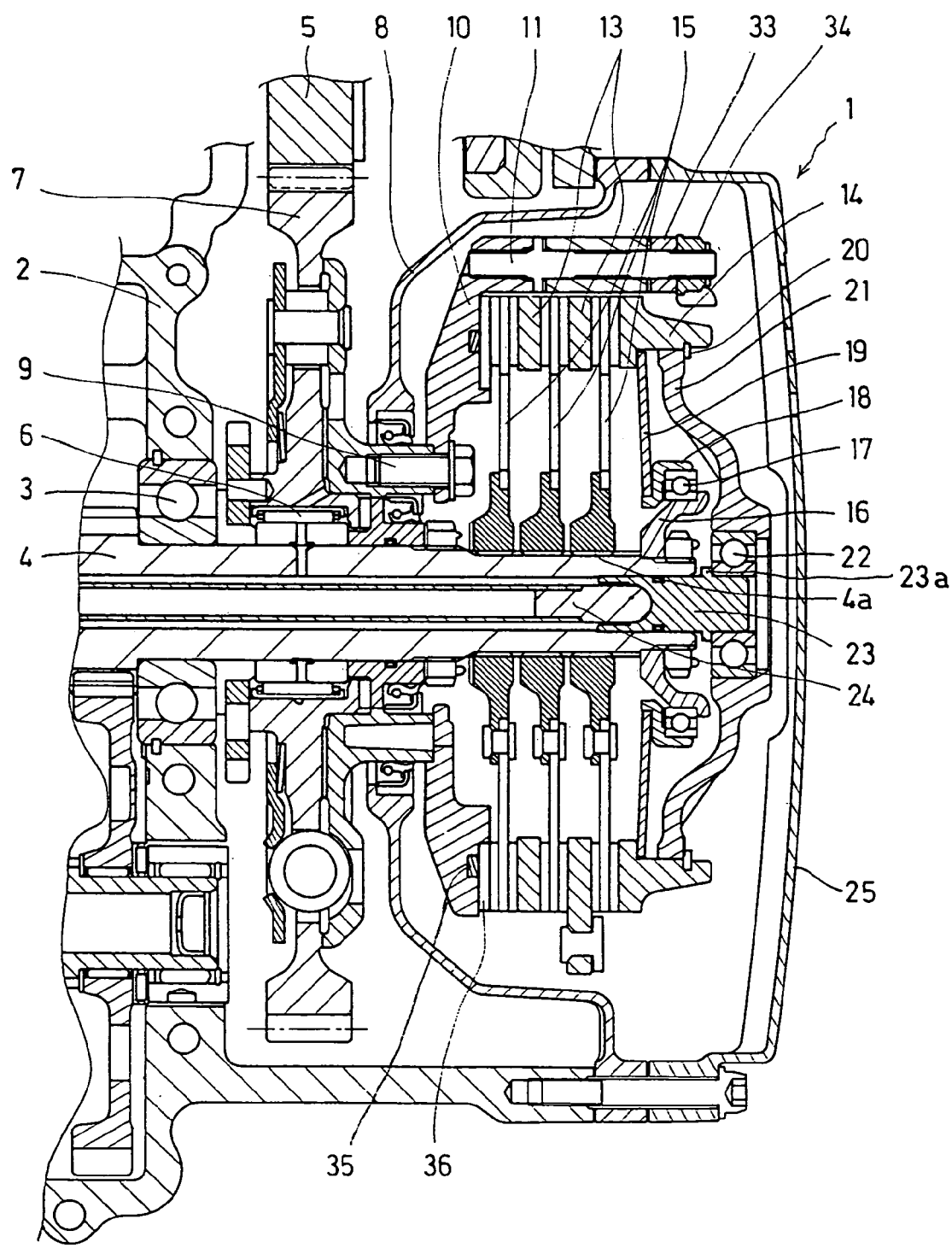
FIG. 1 is a longitudinal sectional view of a dry multiple-disk clutch in a first embodiment according of the present invention and parts associated with the former.

FIG. 1 is a longitudinal sectional view of a dry multiple-disk clutch 1 in a first embodiment of the present invention intended to be applied to a motorcycle, and parts associated with the dry multiple-disk clutch 1. The dry multiple-disk clutch 1 is mounted on one end of a transmission input shaft 4 included in a transmission. The transmission input shaft 4 is extended parallel to the crankshaft of an engine, not shown, i.e., a drive shaft, and supported for rotation in a ball bearing 3 on a crankcase 2. A driven gear 7 is supported for rotation by a needle bearing 6 on the transmission input shaft 4 and engaged with a drive gear 5. A side cover 8 is disposed near the driven gear 7.

Figure 11:
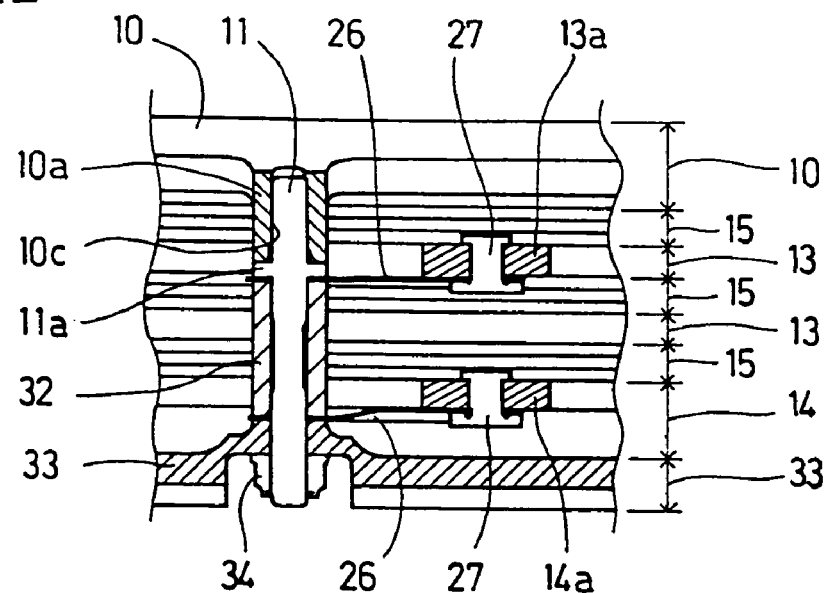
FIG. 11 is a sectional view taken on the line XI—XI in FIG. 2.
Figure 12:
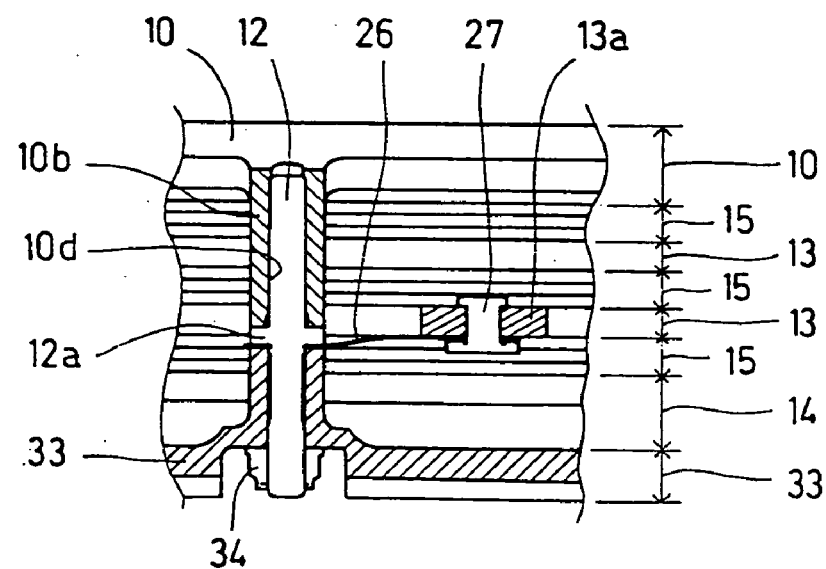
FIG. 12 is a sectional view taken on the line XII—XII in FIG. 2.

The dry multiple-disk clutch 1 includes the following members as principal components. An outer clutch member 10 disposed on the outer side of the side cover 8 and the driven gear 7 are united with bolts 9. Two driving friction disks 13 and one annular pressure member 14 are connected to the outer clutch member 10 by strap plates 26, first collar studs 11 (FIGS. 1 and 11) and second collar studs 12 (FIG. 12). Three driven friction disks 15 and the two driving friction disks 13 are arranged axially alternately. The pressure member 14 is adjacent to the outermost driven friction disk 15. The inside circumferences of the driven friction disks 15 are engaged with splines formed on the transmission input shaft 4. The driven friction disks 15 are axially movable on the transmission input shaft 4. A coned disk spring 19 for applying pressure to the friction disks is supported by a first disk spring holder 16, a ball bearing 17 and a second disk spring holder 18 on the outer end of the transmission input shaft 4. The coned disk spring 19 presses the pressure member 14 toward the outer clutch member 10. An annular release plate 21 is held in place on the pressure member 14 with a snap ring 20. A release pin 23 is fitted in the inner ring of a ball bearing 22 fitted in a central hole of the release plate 21. The release pin 23 is provided with a flange 23a. The inner ring of the ball bearing 22 is pressed against the flange 23a of the release pin 23. A release rod 24 is extended in an axial bore formed in the transmission input shaft 4. The release rod 24 is pushed axially outward to push the release pin 23 axially outward. The dry multiple disk clutch 1 is covered with a clutch cover 25.

Figure 2:
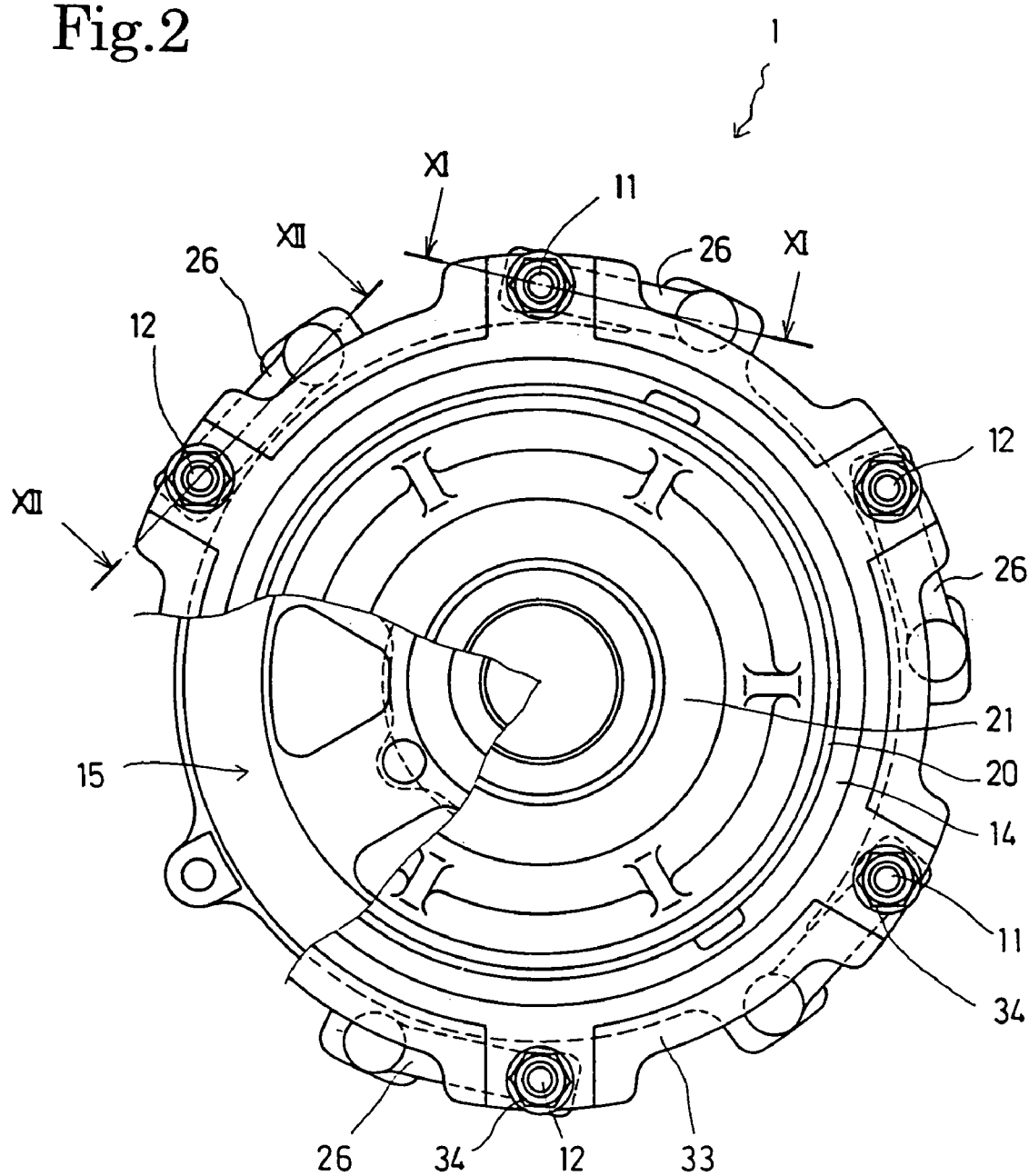
FIG. 2 is a partly cut away end view of the dry multiple-disk clutch shown in FIG. 1.

Referring to FIG. 2 showing the dry multiple disk clutch 1 in a partly cutaway end view, there are shown the release plate 21, the snap ring 20 and the pressure member 14. The first collar studs 11 and the second collar studs 12 are arranged circumferentially alternately.

Figure 3:
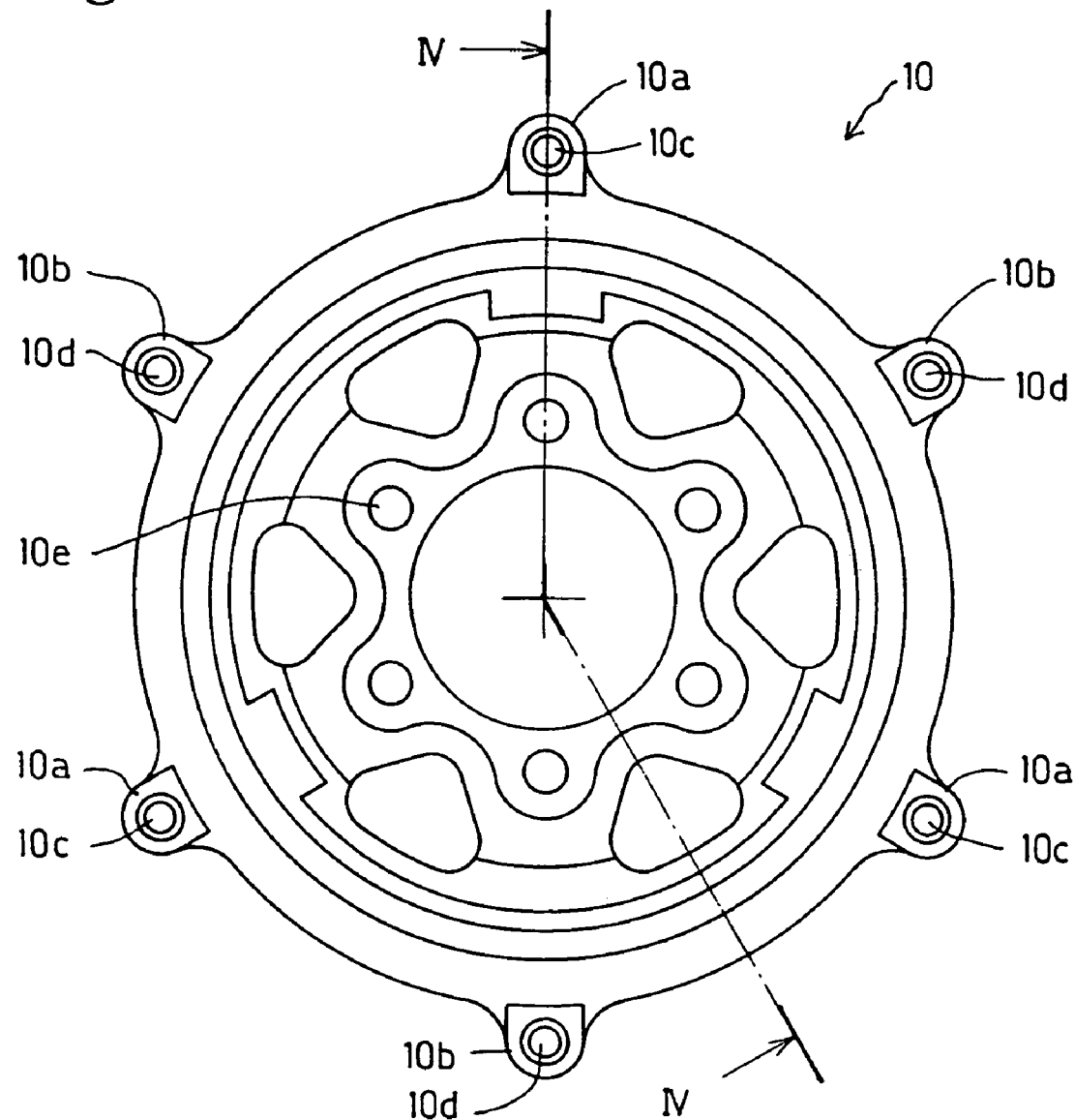
FIG. 3 is an end view of an outer clutch member.
Figure 4:
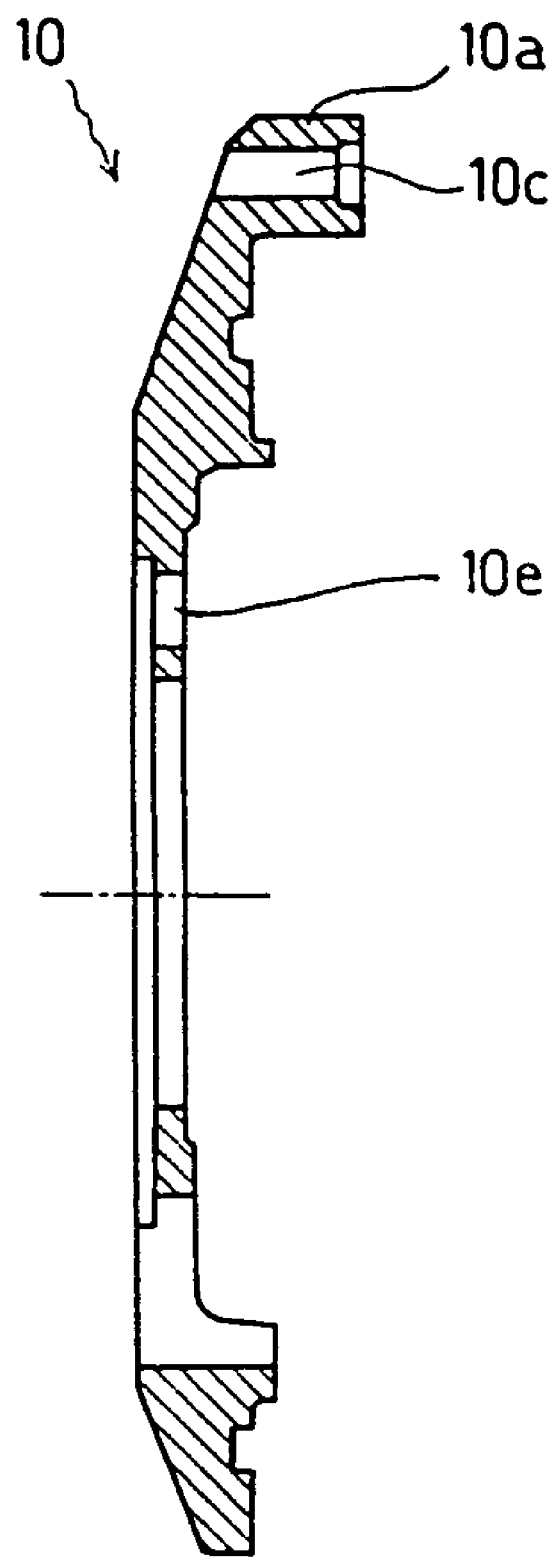
FIG. 4 is a sectional view taken on the line IV—IV in FIG. 3.

FIG. 3 shows the outer clutch member 10 in an end view and FIG. 4 is a sectional view taken on the line IV—IV in FIG. 3. External projections 10a and 10b are arranged alternately on the outside circumference of the outer clutch member 10. The external projections 10a and 10b are provided with threaded holes 10c and 10d, respectively. The collar studs 11 and 12 are engaged in the threaded holes 10c and 10d, respectively. The external projections 10a and 10b have slightly different axial lengths, respectively, as shown in FIGS. 11 and 12. The outer clutch member 10 is provided with holes 10e. The bolts 9 are passed through the holes 10e to fasten the outer clutch member 10 to the driven gear 7.

Figure 5:
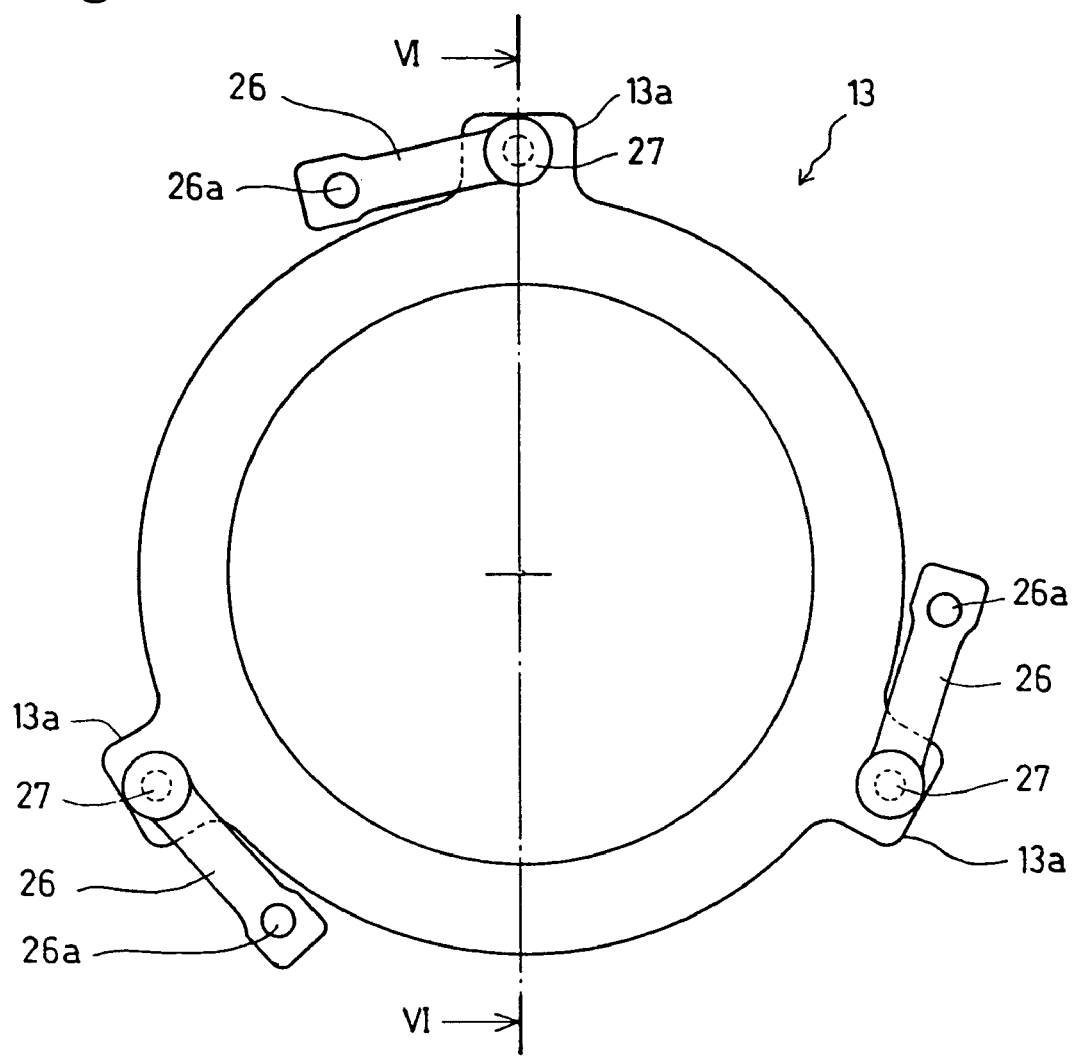
FIG. 5 is an end view of a driving friction disk.
Figure 6:
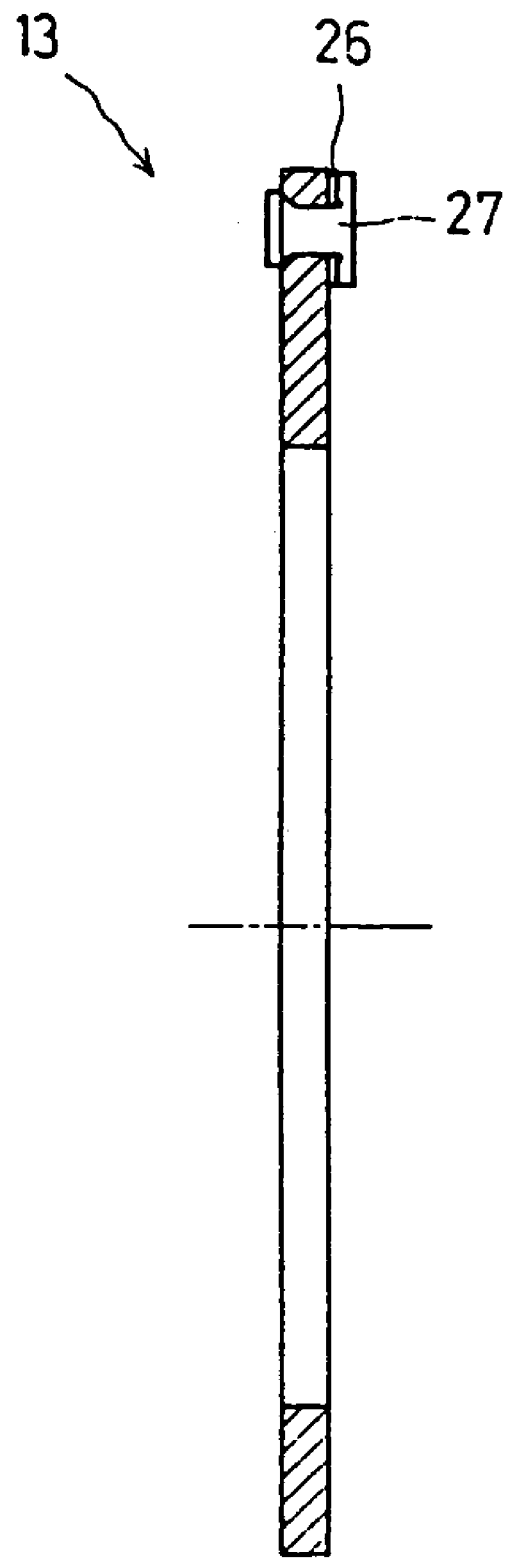
FIG. 6 is a sectional view taken on the line VI—VI in FIG. 5.

FIG. 5 shows the driving friction disk 13 in an end view and FIG. 6 is a sectional view taken on the line VI—VI in FIG. 5. The driving friction disk 13 is provided with three external projections 13a on its outside circumference. Each of strap plates 26 has one end fastened to the external projection 13a with a rivet 27 such that the strap plate 26 is substantially tangent to the outside circumference of the driving friction disk 13, and the other end provided with a hole 26a. The two driving friction disks 13 of the dry multiple-disk clutch have the same shape. The first collar studs 11 are passed through the holes 26a of one of the driving friction disks 13, and the second collar studs 12 are passed through the holes 26a of the other driving friction disk 13.

Figure 7:
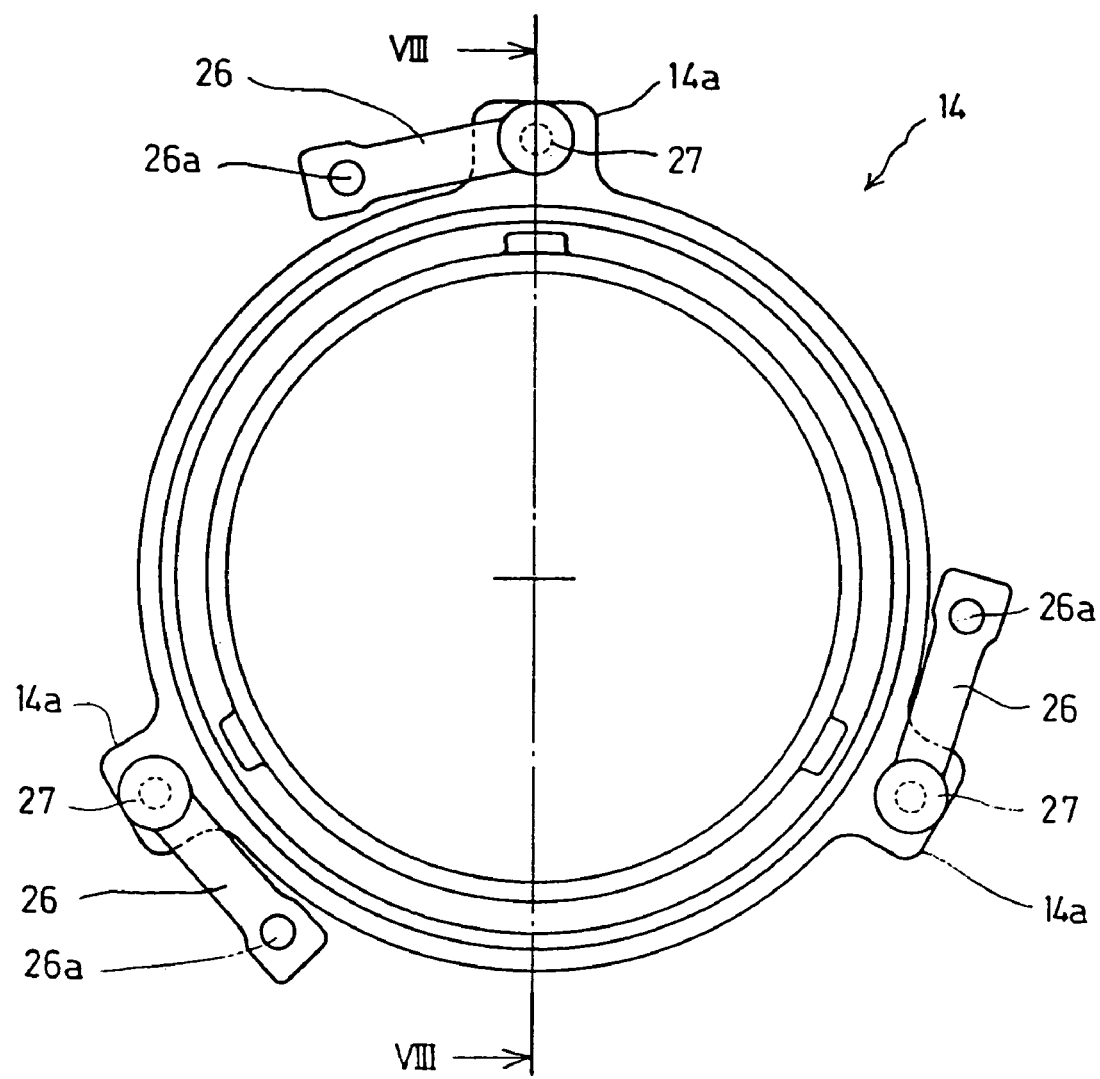
FIG. 7 is an end view of a pressure member.
Figure 8:
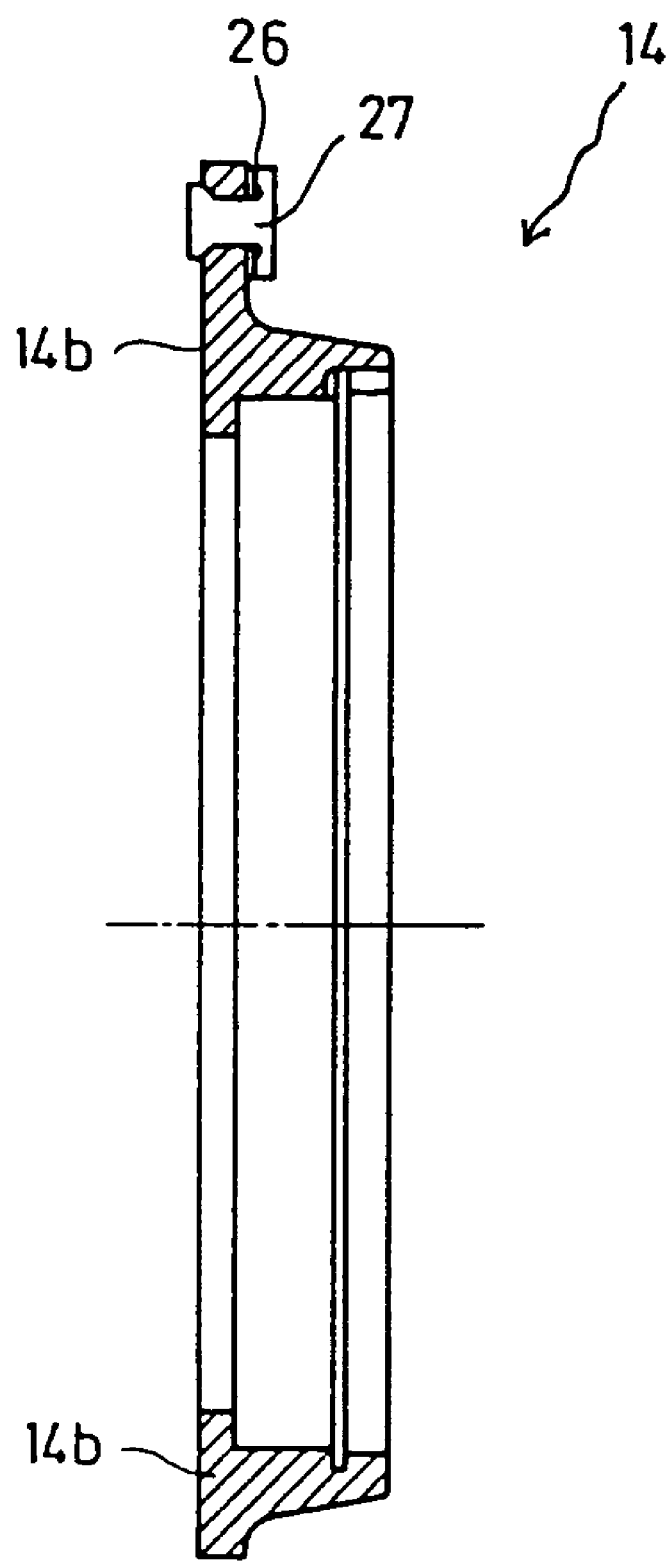
FIG. 8 is a sectional view taken on the line VIII—VIII in FIG. 7.

FIG. 7 shows the pressure member 14 in an end view and FIG. 8 is a sectional view taken on the line VIII—VIII in FIG. 7. The pressure member 14 is provided with three external projections 14a on its outside circumference. Each of the strap plates 26 has one end fastened to the external projection 14a with a rivet 27 such that the strap plate 26 is substantially tangent to the outside circumference of the pressure member 14, and the other end provided with a hole 26a. The first collar studs 11 are passed trough the holes 26a of the strap plates 26. The pressure member 14 has an inner friction surface 14b as shown in FIG. 8.

Figure 9:
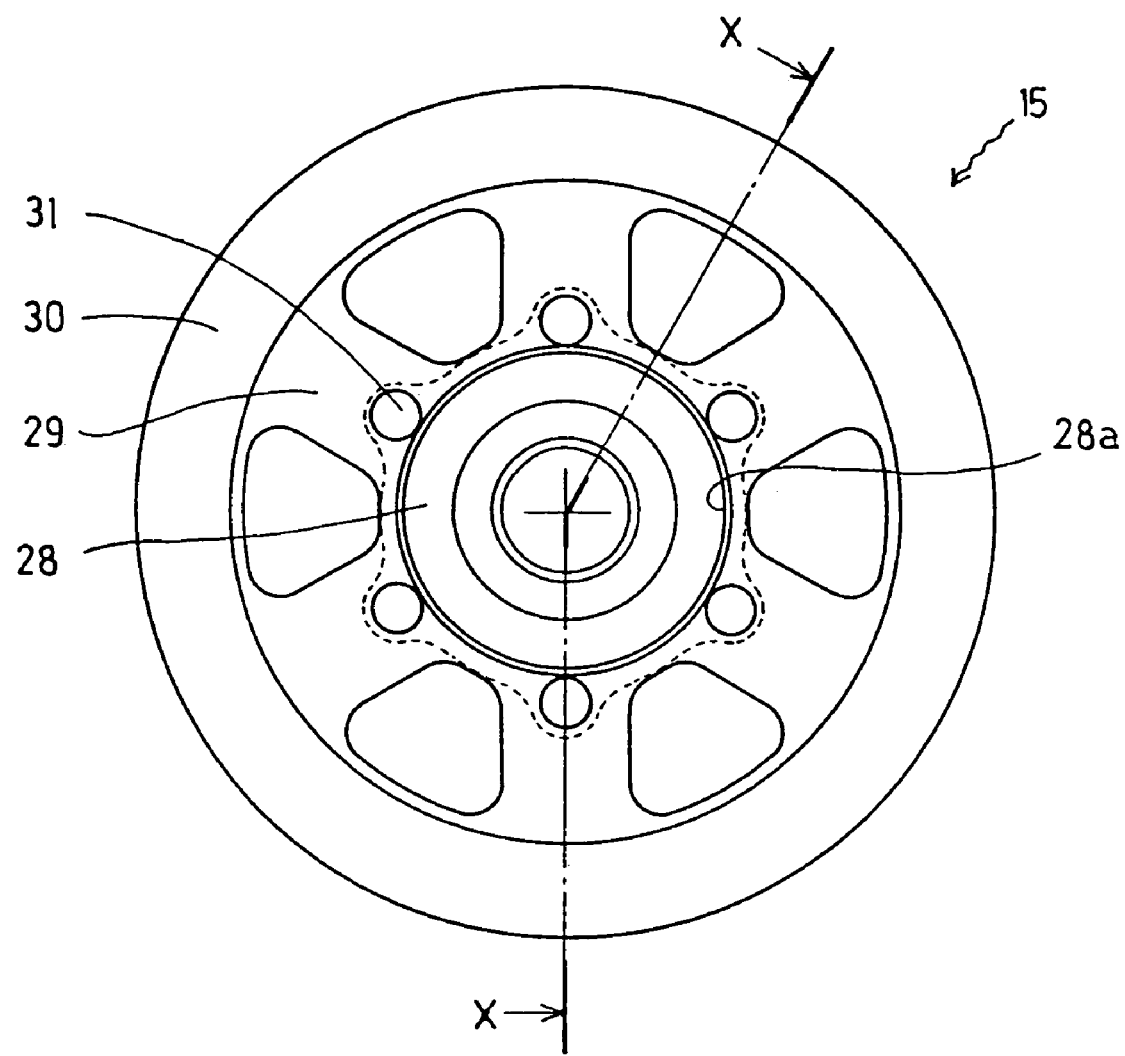
FIG. 9 is an end view of a driven friction disk.
Figure 10:
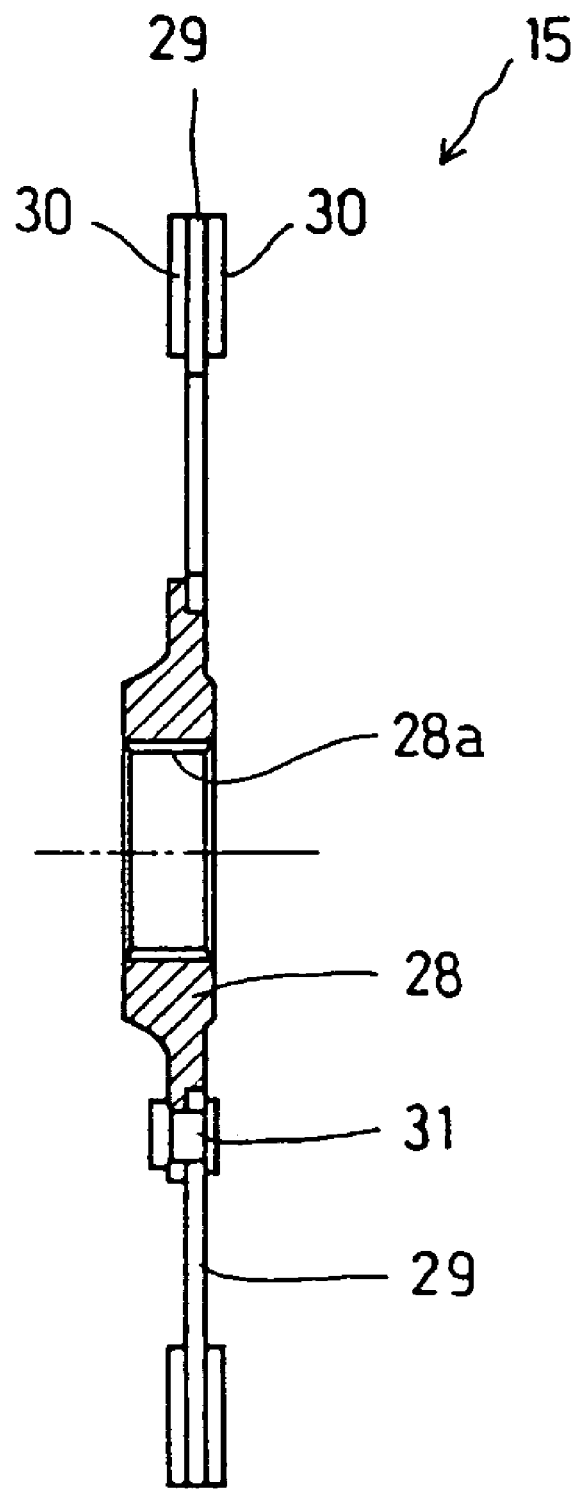
FIG. 10 is a sectional view taken on the line X—X in FIG. 9.

FIG. 9 shows the driven friction plate 15 in an end view and FIG. 10 is a sectional view taken on the line X—X in FIG. 9. The driven friction disk 15 has a shape resembling a wheel. The driven friction disk 15 has a hub 28, an annular plate 29 and rims 30. The annular plate 29 is fastened to the hub 28 with rivets 31. Splines 28a are formed in the side surface of the bore of the hub 28. The splines 28a engage with the splines 4a (FIG. 1) of the transmission input shaft 4. The annular plate 29 and the rims 30 are formed of the same material. The rims 30 are bonded adhesively to the outer and inner surfaces of a peripheral part of the annular plate 29.

FIG. 11 is a sectional view taken on the line XI—XI in FIG. 2. FIG. 11 shows the engaged dry multiple-disk clutch 1. The driven friction disk 15, the driving friction disk 13, the driven friction disk 15, the driving friction disk 13, the driven friction disk 15 and the pressure member 14 are arranged in that order from the side of the outer clutch member 10 outward. The external projection 13a of the driving friction disk 13, the external projection 14a of the pressure member 14, and the strap plates 26 fastened to those external projections with the rivets 27 are seen in FIG. 11. An externally threaded inner part of the first collar stud 11 extending inward from a collar 11a formed on the first collar stud 11 is screwed in the threaded hole 10c of the external projection 10a of the outer clutch member 10. The strap plate 26 fastened to the driving friction disk 13, a collar 32, the strap plate 26 fastened to the pressure member 14, and an outer clutch plate 33 are mounted in that order on an outer part of the first collar stud 11 extending outward from the collar 11a, and are fastened to the outer part of the first collar stud 11 with a nut 34 screwed on an externally threaded outer end of the outer part of the first collar stud 11. The first collar stud 11 is passed through the hole 26a of the strap plate 26. The outer clutch plate 33 is an annular member for holding the free ends of the six collar studs 11 and 12 at equal angular intervals.

FIG. 12 is a sectional view taken on the line XII—XII in FIG. 2. FIG. 12 shows the engaged dry multiple-disk clutch 1. The driven friction disk 15, the driving friction disk 13, the driven friction disk 15, the driving friction disk 13, the driven friction disk 15 and the pressure member 14 are arranged in that order from the side of the outer clutch member 10 outward. The external projection 13a of another driving friction disk 13, namely, the driving friction disk 13 not shown in FIG. 11, and the strap plate 26 fastened to the external projection 13a with the rivets 27 are seen in FIG. 12. An externally threaded inner part of the second collar stud 12 extending inward from a collar 12a formed on the second collar stud 12 is screwed in the threaded hole 10d of the external projection 10b outer clutch member 10. The externally threaded part of the second collar stud 12 screwed in the threaded hole 10d has a length longer than that of the externally threaded inner part of the first collar stud 11 screwed in the threaded hole 10. The strap plate 26 fastened to the driving friction disk 13, and the outer clutch plate 33 are mounted in that order on an outer part of the second collar stud 12 extending outward from the collar 12a, and are fastened to the outer part of the second collar stud 12 with a nut 34 screwed on an externally threaded outer end of the outer part of the second collar stud 12. Any collar is not put on the second collar stud 12. The second collar stud 12 is passed through the hole 26a of the strap plate 26. When the outer clutch member 10 turns, i.e., when the outer clutch member 10 moves to the left as viewed in FIGS. 11 and 12, the driving friction disks 13 and the pressure member 14 are pulled by the strap plates 26 and rotate together with the outer clutch member 10.

Referring to FIG. 1, a coned disk spring 35 for vibration control is fitted in a groove formed in a surface, facing the driven friction disk 15, of the outer clutch member 10. An annular vibration control plate 36 is held between the coned disk spring 35 and a friction surface of the driven friction disk 15 nearest to the outer clutch member 10. The coned disk spring 35 presses the vibration control plate 36 against the driven friction disk 15. The coned disk spring 35 absorbs axial vibrations of the friction disks 13 and 15 to prevent the dry multiple-disk clutch 1 from generating vibrational noise.

The coned disk spring 19 for applying pressure to the friction disks 13 and 15 is supported at the outer end of the dry multiple-disk clutch 1 by the first disk spring holder 16 fastened to the outer end of the transmission input shaft 4, the ball bearing 17, and the second disk spring holder 18. The coned disk spring 19 apply pressure through the pressure member 14 to the friction disks 13 and 15 toward the outer clutch member 10 to engage the dry multiple-disk clutch 1.

The annular release plate 21 is held in place on the pressure member 14 with the snap ring 20. The release pin 23 is fitted in the inner ring of the ball bearing 22 fitted in the central hole of the release plate 21. The outer end of the release rod 24 extended through the transmission input shaft 4 is in contact with the inner end of the release pin 23. The release rod 24 is pushed axially outward by hydraulic or mechanical force to disengage the dry multiple-disk clutch 1. Then, the release plate 21 is moved outward through the release pin 23, and the ball bearing 22 in contact with the flange 23a of the release pin 23 to push the pressure member 14 outward, i.e., in a direction away from the outer clutch member 10, against the resilience of the coned disk spring 19 through the snap ring 20 by the release plate 21. Consequently, the contact surfaces of the outer clutch member 10, the vibration control plate 36, the driving friction disks 13, the driven friction disks 15 and the pressure member 14 are separated to disengage the dry multiple-disk clutch 1. Thus, power transmission from the outer clutch member 10 to the transmission input shaft 4, namely, power transmission from the crankshaft of the engine to the transmission, is cut off.

Strap plates 26 are formed of an elastic metal. As shown in FIGS. 11 and 12, the strap plates 26 warp elastically while the dry multiple-disk clutch 1 is engaged. When the pressure member 14 is pushed away from the outer clutch member 10 by the release rod 24 and pressure acting between the adjacent friction surfaces is removed, the driving friction disks 13 and the pressure member 14 are moved by the resilience of the strap plate 26 so that the friction surfaces are separated. Thus, the dry multiple-disk clutch 1 can be satisfactorily sharply disengaged. When the pressure applied to the release rod 24 is removed, the dry multiple-disk clutch 1 is engaged by the pressure exerted by the coned disk spring 19.

Thus, the two driving friction disks 13 and the single pressure member 14 of the dry multiple-disk clutch 1 in the first embodiment are connected to the outer clutch member 10 by the strap plates 26. Therefore, the rotating outer clutch member 10 drags the driving friction disks 13 and the pressure member 14 through the strap plates 26 and, consequently, the driving friction disks 13 and the pressure member 14 rotates together with the outer clutch member 10. Since there are not any gaps corresponding to the gaps between the external teeth of the driving friction disks and edges of the parts of the side wall of the outer clutch member defining the slots in the conventional dry multiple-disk clutch, the dry multiple-disk clutch 1 in the first embodiment does not generate any hitting sounds. Thus, the dry multiple-disk clutch 1 in the first embodiment operates silently.

The conventional dry multiple-disk clutch mentioned above needs the outer clutch member provided in its side wall with the slots and having the shape of a large bottomed cylinder. The dry multiple-disk clutch 1 in the first embodiment can be formed in compact construction by fastening the strap plates 26 attached to the driving friction disks 13 and the pressure member 14 to the six collar studs 11 and 12 attached to the outer clutch member 10.

The splines 28a formed in the hubs 28 of the driven friction disks 15 are engaged directly with the splines 4a formed on the transmission input shaft 4 without using any member corresponding to the inner clutch member of the conventional dry multiple-disk clutch. Thus, the dry multiple-disk clutch 1 in the first embodiment needs fewer parts and is simpler in construction than the conventional dry multiple-disk clutch.

Figure 13:
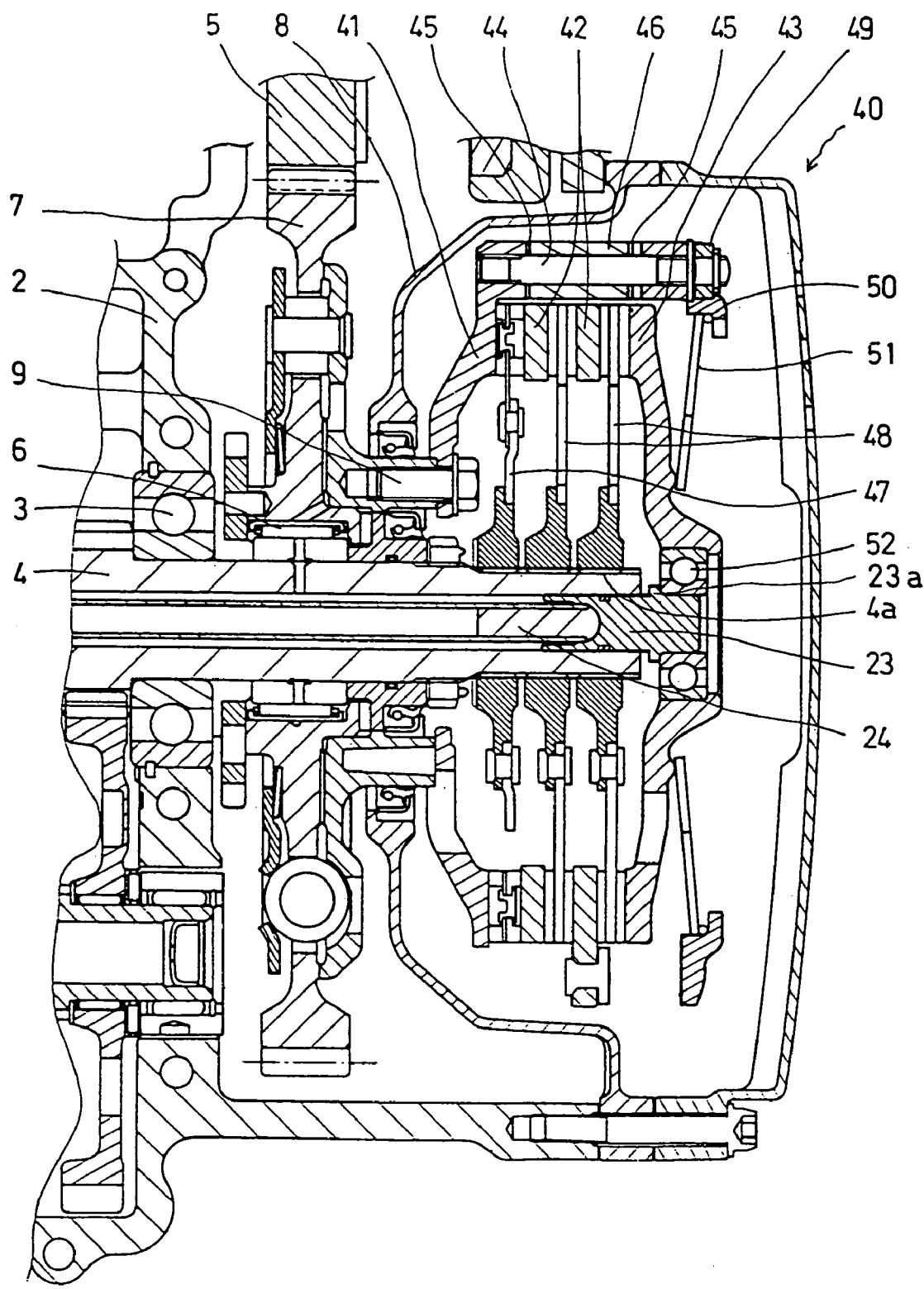
FIG. 13 is a longitudinal sectional view of a dry multiple-disk clutch in a second embodiment of the present invention and parts associated with the former.

FIG. 13 shows a dry multiple-disk clutch 40 in a second embodiment of the present invention and parts associated with the former. The dry multiple-disk clutch 40, similarly to the dry multiple-disk clutch 1 in the first embodiment, is mounted on one end of a transmission input shaft 4 included in a transmission. The transmission input shaft 4 is extended parallel to the crankshaft of an engine, not shown, i.e., a drive shaft, and supported for rotation in a ball bearing 3 on a crankcase 2. A driven gear 7 is supported for rotation by a needle bearing 6 on the transmission input shaft 4 and engaged with a drive gear 5. A side cover 8 is disposed near the driven gear 7.

An outer clutch member 41 disposed on the outer side of the side cover 8 and the driven gear 7 are united with bolts 9. Two driving friction disks 42 and an annular pressure member 43 are connected to the outer clutch member 41 by strap plates 45 put on collars 46 put on two kinds of collar studs 44. When the outer clutch member 41 rotates, the driving friction disks 42 and the annular pressure member 43 are pulled by the strap plates 45 for rotation together with the outer clutch member 41. The two driving friction disks 42 have the same shape as that of the driving friction disks 13 of the first embodiment. The shape and function of the pressure member 43 are different from those of the pressure member 14 of the first embodiment. The shape and function of the pressure member 43 are the same as those of the combination of the pressure member 14 and the release plate 21 of the first embodiment.

One driven friction disk 47 having a vibration control function is interposed between the outer clutch member 41 and the driving friction disk 42, and two driven friction disks 48, which are the same as the driven friction disks 15 of the first embodiment, are interposed between the adjacent driving friction disks 42 and between the outermost driving friction disk 42 and the pressure member 43, respectively. Splines formed in the bores of the hubs of the driven friction disks 47 and 48 are engaged with splines formed on the transmission input shaft 4. The driven friction disks 47 and 48 are axially movable on the transmission input shaft 4. The outer clutch member 41 of the second embodiment is not provided with any member corresponding to the coned disk spring 35 and the vibration control plate 36 put on the outer clutch member 10 of the first embodiment. The functions of the coned disk spring 35 and the vibration control plate 36 are replaced by the vibration control function of the driven friction disk 47.

A friction-disk-holding coned disk spring 51 is held between an outer clutch plate 50 put on and fastened with nuts 49 to studs 44, and the pressure member 43 to press the pressure member 43 and the friction disks toward the outer clutch member 41. FIG. 13 shows the engaged dry multiple-disk clutch 40.

A central part of the pressure member 43 has the function of a release. An outer end part of a release pin 23 is fitted in the inner ring of a ball bearing 52 fitted in a central bore of the pressure member 43. A release rod 24 extended through the transmission input shaft 4 has an outer end in contact with the inner end of the release pin 23. The release rod 24 is pushed axially outward by hydraulic or mechanical force to disengage the dry multiple-disk clutch 40. Then, the pressure member 43 is moved outward through the release pin 23 and the ball bearing 52 against the resilience of the coned disk spring 51 to move the pressure member 43 away from the outer clutch member 41. Consequently, the contact surfaces of the outer clutch member 41, the driving friction disks 42, the driven friction disk 47 having a vibration control function, the driven friction disks 48 and the pressure member 43 are separated to disengage the dry multiple-disk clutch 40. Thus, power transmission from the outer clutch member 41 to the transmission input shaft 4, namely, power transmission from the crankshaft of the engine to the transmission, is cut off.

Figure 14:
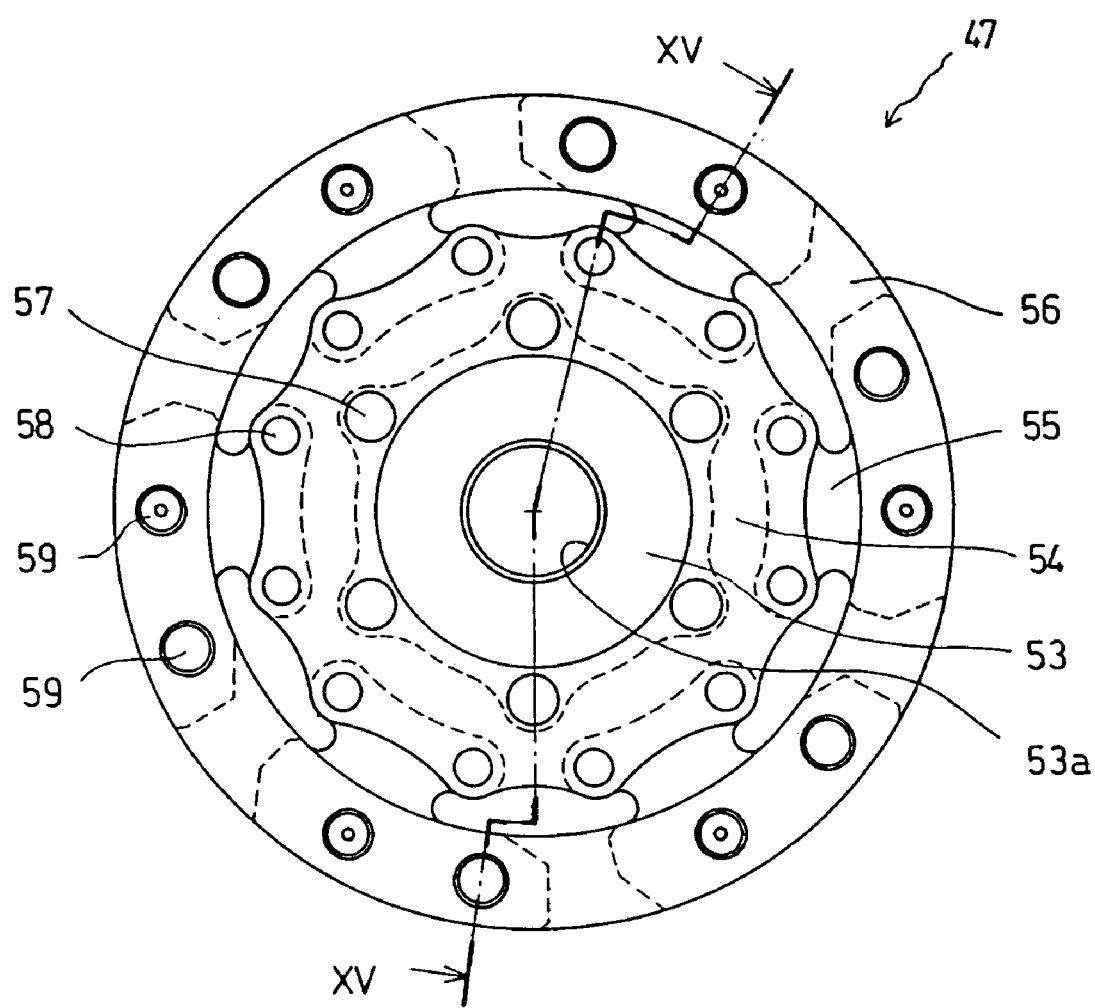
FIG. 14 is a front elevation of a driven friction disk with a vibration control function.
Figure 15:
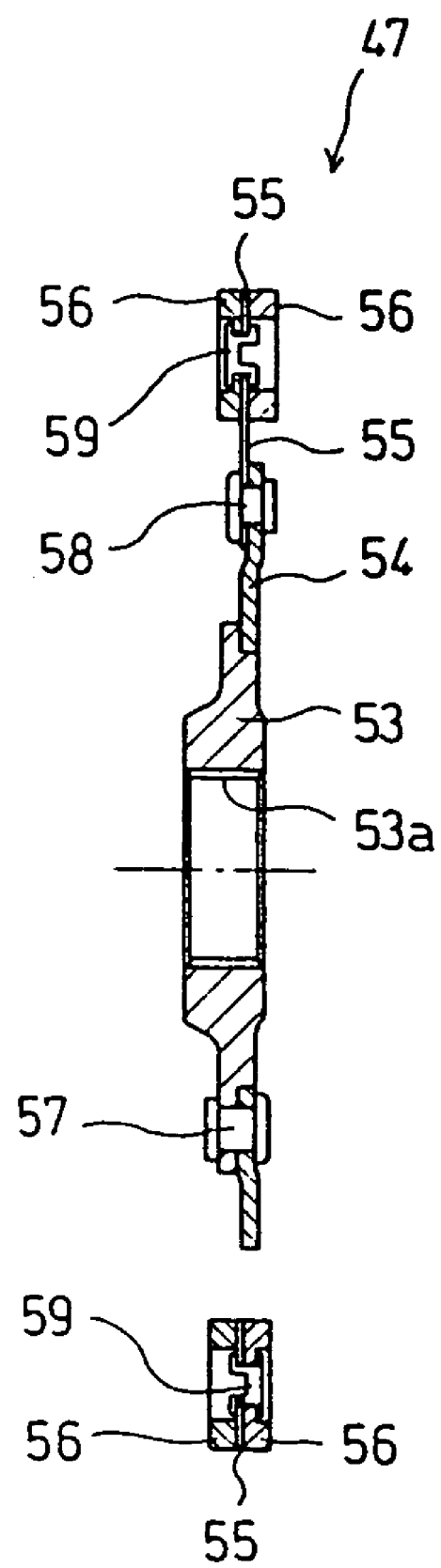
FIG. 15 is a sectional view taken on the line XV—XV in FIG. 14.

FIG. 14 shows the driven friction disk 47 with a vibration control function in an end view, and FIG. 15 is a sectional view take on the line XV—XV in FIG. 14. The driven friction disk 47 with a vibration control function has a hub 53, an annular plate 54, plate springs 55, and two peripheral annular plates 56 facing each other. The annular plate 54 is fastened to the hub 53 with rivets 57. The plate springs 55 are fastened to the annular plate 54 with rivets 58 of a comparatively small diameter. The peripheral annular plates 56 are fastened to the outer and the inner surface of each plate spring 55 with grommets 59. Splines 53a are formed in the side surface of the bore of the hub 53. The splines 53a are engaged with the splines 4a formed on the transmission input shaft 4.

Figure 16:
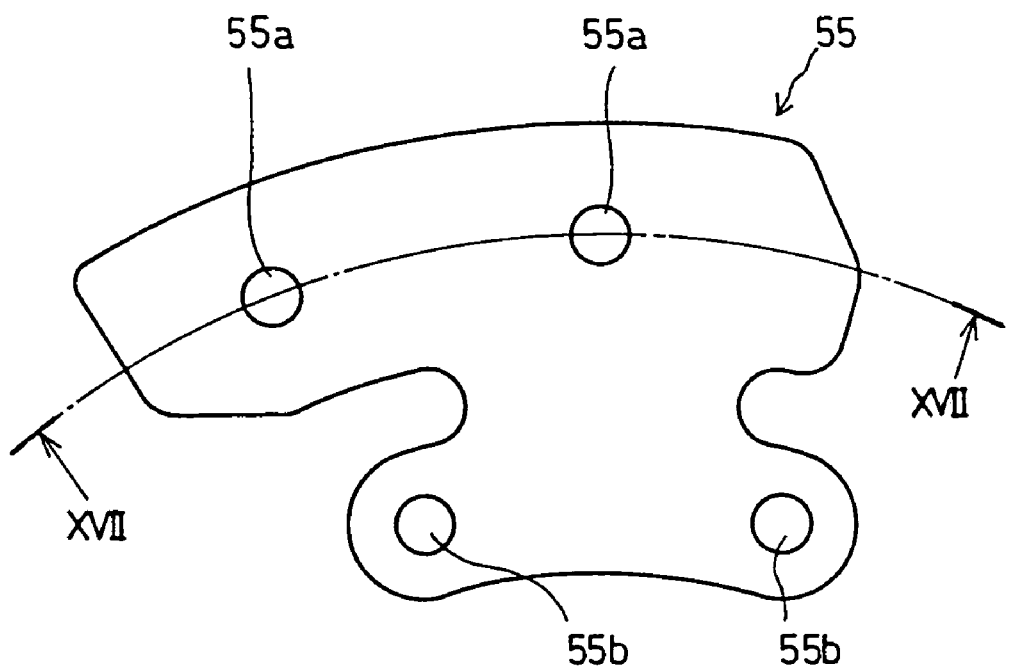
FIG. 16 is an enlarged front elevation of a plate spring.
Figure 17:
FIG. 17 is a sectional view taken on the line XVII—XVII in FIG. 16.

FIG. 16 shows the plate spring 55 in an enlarged front elevation and FIG. 17 is a sectional view taken on the line XVII—XVII in FIG. 16. The plate spring 55 is formed of an elastic metal. Parts on the opposite sides of a central part of the plate spring 55 are warped in opposite directions, respectively, in a natural state as shown in FIG. 17. The plate spring 55 is provided with grommet receiving holes 55a and rivet receiving holes 55b through which the rivets 58 are passed. As shown in FIG. 15, the peripheral annular plates 56 are fastened to the opposite surfaces of the plate springs 55 with the grommets 59 inserted in the grommet receiving holes 55a. The two grommets 59 are inserted in the two grommet receiving holes 55a of each plate spring 55 in opposite directions, respectively. One of those two grommets 59 fastens one of the peripheral annular plates 56 to the plate spring 55, and the other grommet 59 fastens the other peripheral annular plate 56 to the same plate spring 55. The two peripheral annular plates 56 are spaced apart by the plate springs 55 warped in a natural state. When the dry multiple-disk clutch 40 is engaged, the peripheral annular plates 56 are urged in opposite directions, respectively, by the agency of the plate springs 55. Thus, the driven friction disk 47 with a vibration control function absorbs axial vibrations of the friction disks 42 and 48 to prevent the dry multiple-disk clutch 40 from generating vibrational noise.

As apparent from the foregoing description, the dry multiple-disk clutch 40 in the second embodiment, similar to the dry multiple-disk clutch 1 in the first embodiment, prevents the generation of hitting sounds that is caused by the collision of the external teeth of the driving friction disks against the edges of parts of the side wall of the outer clutch member defining the slots in the conventional dry multiple-disk clutch by the agency of the plate springs 55. Since the dry multiple-disk clutch 40 in the second embodiment does not need an inevitably large outer clutch member having the shape of a bottomed cylinder, the dry multiple-disk clutch 40 can be formed in compact construction. Since the dry multiple-disk clutch 40 does not need any member corresponding to the inner clutch member of the conventional dry multiple-disk clutch, the dry multiple-disk clutch 40 in the second embodiment needs fewer parts. The driven friction disk 47 with a vibration control function effectively prevents the generation of vibrations by the friction surfaces of the friction disks. Since the pressure member 43 has a releasing function, the dry multiple-disk clutch 40 in the second embodiment does not need any member corresponding to the release plate 21 of the first embodiment, and needs fewer parts than the dry multiple-disk clutch 1 in the first embodiment. Since the coned disk spring 51 retained in place by the outer clutch plate 50 connected to the outer clutch member 41 presses the pressure member 43, the dry multiple-disk clutch 40 in the second embodiment does not need any member corresponding to the first disk spring holder 16, the ball bearing 17 and the second disk spring holder 18 of the dry multiple-disk clutch 1 in the first embodiment. Thus, the dry multiple-disk clutch 40 in the second embodiment requires a reduced number of parts and can be formed in compact, lightweight construction.

Although the present embodiments of the invention have been described in detail, persons skilled in the art will understand that variations and modifications may be made thereto within the spirit and essence of the invention. The scope of the invention is indicated by the appended claims.

What is claimed is:

1. A dry multiple-disk clutch for transmitting power from a drive shaft to a transmission input shaft, said dry multiple-disk clutch comprising:

an outer clutch member interlocked wit the drive shaft so as to be driven for rotation by the drive shaft;

a plurality of driving friction disks interlocked wit the outer clutch member;

a plurality of driven friction disks alternated with the driving friction disks and interlocked wit the transmission input shaft;

a pressure member disposed opposite to the outer clutch member with the driving and the driven friction disks arranged alternately between the outer clutch member and the pressure member, which moves in opposite axial directions to compress the driving and the driven friction disks together and to disengage the driven friction disks from the driving friction disks; and strap plates disposed between peripheral parts of the outer clutch member and peripheral parts of the driving friction disks, and connecting the respective peripheral parts of the outer clutch member and the driving friction disks, wherein said peripheral parts of adjoining one of the driving friction disks are disposed at different peripheral positions to prevent the strap plates connected to the adjoining driving friction disks from extending in a same angular region around the transmission input shaft.

2. The dry multiple-disk clutch according to claim 1, wherein each of the driving friction disks is provided wit a plurality of external projections, the outer clutch member is provided with a plurality of external projections, studs are attached to the external projections of the outer clutch member, respectively, and each of the strap plates has one end attached to the external projection of a corresponding one of the driving friction disks and the other end fitted on a corresponding one of the studs, said outer clutch member having means for pressing the driving friction disks and the driven friction disks against each other.

3. The dry multiple-disk clutch according to claim 1, wherein the strap plates are substantially tangent to the circumferences of the driving friction disks.

4. The dry multiple-disk clutch according to claim 1 further comprising strap plates disposed between respective peripheral parts of the outer clutch member and the pressure member, and connecting the outer clutch member and the pressure member.

5. The dry multiple-disk clutch according to claim 4, wherein the strap plates connected to the pressure member are substantially tangent to the circumference of the pressure member.

6. The dry multiple-disk clutch according to claim 1, wherein the pressure member is provided with a plurality of external projections, the outer clutch member has external projections at said peripheral parts thereof, respectively, studs are attached to the external projections of the outer clutch member, respectively, and each of the strap plates has one end attached to a corresponding one of the external projections of the pressure member, and the other end fitted on a stud attached to a corresponding one of the external projections of the outer clutch member, said external projections of the pressure member are disposed at peripheral positions different from peripheral positions of said peripheral parts of a driving friction disk situated nearest to the pressure member.

7. The dry multiple-disk clutch according to claim 1, wherein a vibration control means is interposed between the outer clutch member and the driven friction disk adjacent to the outer clutch member.

8. The dry multiple-disk clutch according to claim 1, wherein the driven friction disk adjacent to the outer clutch member includes a vibration control mechanism.

9. The city multiple-disk clutch according to claim 8, wherein the vibration control mechanism includes warped plate springs sandwiched between peripheral friction members.

10. The dry multiple-disk clutch according to claim 9, wherein said vibration control mechanism further includes grommets disposed with the warped plate springs between the peripheral friction members.

11. The dry multiple-disk clutch according to claim 8, wherein the vibration control mechanism includes an annular vibration control plate and a coned disk spring which operatively engages the vibration control plate.

12. The dry multiple-disk clutch according to claim 1, wherein the strap plates are formed of elastic metal.

13. The dry multiple-disk clutch according to claim 1, wherein the pressure member includes a planar contacting surface.

14. The dry multiple-disk clutch according to claim 1, wherein the outer clutch member is disposed outwardly of an outermost one of the driving friction disks relative to an axial direction of the clutch.

15. The dry multiple-disk clutch according to claim 1, wherein the peripheral parts of the outer clutch member and the driving friction disks are radially outermost peripheral parts.

* * * * *